United States Patent
Pajukoski et al.

(10) Patent No.: US 9,420,544 B2
(45) Date of Patent: Aug. 16, 2016

(54) METHOD AND APPARATUS FOR DETERMINING TRANSMISSION POWER

(75) Inventors: Kari Pekka Pajukoski, Oulu (FI); Esa Tapani Tiirola, Kempele (FI); Kari Juhani Hooli, Oulu (FI); Pasi Eino Tapio Kinnunen, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 199 days.

(21) Appl. No.: 14/002,997

(22) PCT Filed: Mar. 17, 2011

(86) PCT No.: PCT/EP2011/054037
§ 371 (c)(1),
(2), (4) Date: Sep. 4, 2013

(87) PCT Pub. No.: WO2012/123030
PCT Pub. Date: Sep. 20, 2012

(65) Prior Publication Data
US 2013/0343218 A1 Dec. 26, 2013

(51) Int. Cl.
| | |
|---|---|
| *H04B 7/02* | (2006.01) |
| *H04W 52/18* | (2009.01) |
| *H04W 52/24* | (2009.01) |
| *H04W 52/14* | (2009.01) |
| *H04W 52/28* | (2009.01) |

(52) U.S. Cl.
CPC .............. *H04W 52/18* (2013.01); *H04B 7/024* (2013.01); *H04W 52/242* (2013.01); *H04W 52/146* (2013.01); *H04W 52/286* (2013.01)

(58) Field of Classification Search
CPC . H04W 52/10; H04W 52/146; H04W 52/242; H04W 52/40; H04W 52/18; H04W 52/286; H04B 7/024
See application file for complete search history.

(56) References Cited

U.S. PATENT DOCUMENTS

| | | | |
|---|---|---|---|
| 8,706,152 B2* | 4/2014 | Seo et al. ................. | 455/522 |
| 2010/0029212 A1* | 2/2010 | Malladi et al. ............ | 455/63.1 |

FOREIGN PATENT DOCUMENTS

| | | |
|---|---|---|
| CN | 101345970 A | 1/2009 |
| WO | WO-2009/135848 A2 | 11/2009 |

(Continued)

OTHER PUBLICATIONS

3GPP TS 36.214 v9.2.0 (Jun. 2010); 3rd Generation Partnership Project; Technical Specification Group Radio Access Network; Evolved Universal Terrestrial Radio Access (E-UTRA); Physical layer; Measurements (Release 9) (14 pages).

(Continued)

*Primary Examiner* — Jae Y Lee
*Assistant Examiner* — Aixa Guadalupe-Cruz
(74) *Attorney, Agent, or Firm* — Harrington & Smith (57) ABSTRACT

A technique, including in a communication system involving a plurality of access nodes cooperatively detecting a transmission from a communication device, determining at said communication device a transmission power parameter relating to said communication device at least partly on the basis of a plurality of pathloss values including a first pathloss value for a first set of access nodes of said plurality of access nodes transmitting a first reference signal at substantially the same transmission power and a second pathloss value for one or more second access nodes of said plurality of access nodes transmitting a second reference signal at substantially the same transmission power.

20 Claims, 2 Drawing Sheets

(56) References Cited

FOREIGN PATENT DOCUMENTS

| WO | WO-2010/015286 A1 | 2/2010 |
| WO | WO 2010/035966 A2 | 4/2010 |
| WO | WO 2010/124241 A2 | 10/2010 |
| WO | WO 2011/100673 A1 | 8/2011 |

OTHER PUBLICATIONS

3GPP TS 36.331 v9.3.0 (Jun. 2010); 3rd Generation Partnership Project: Technical Specification Group Radio Access Network; Evolved Universal Terrestrial Radio Access (E-UTRA); Radio Resource Control (RRC); Protocol specification (Release 9) (250 pages).
3GPP TS 36.212 v9.3.0 (Sep. 2010): 3rd Generation Partnership Project; Technical Specification Group Radio Access Network; Evolved Universal Terrestrial Radio Access (E-UTRA); Multiplexing and channel coding (Release 9) (61 pages).
3GPP TSG RAN1 #64, Taipei, Taiwan, Feb. 21-25, 2011, R1-110869, "discussion of RRH Deployment with Single Cell ID", Motorola Mobility, 3 pgs.
3GPP TS 36.101 V12.0.0 (Jul. 2013), "$3^{rd}$ Generation Partnership Project; Technical specification Group Radio Access Network; Evolved Universal Terrestrial Radio Access (E-UTRA); User Equipment (UE) radio transmission and reception (Release 12)", 450 pgs.
3GPP TS 36.213 V9.3.0 (Sep. 2010), "$3^{rd}$ Generation Partnership Project; Technical Specification Group Radio Access Network, Evolved Universal Terrestrial Radio Access (E-UTRA); Physical layer procedures (Release 9)", 80 pgs.
3GPP TS 36.321 V11.3.0 (Jun. 2013), "$3^{rd}$ Generation Partnership Project; Technical Specification Group Radio Access network; Evolved Universal Terrestrial Radio Access (E-UTRA); Medium Access Control (MAC) protocol specification (Release 11)", 57 pgs.

\* cited by examiner

METHOD AND APPARATUS FOR DETERMINING TRANSMISSION POWER

Communicating over a wireless interface can involve cooperatively detecting a transmission from a communication device at a plurality of access nodes.

A communication device can be understood as a device provided with appropriate communication and control capabilities for enabling use thereof for communication with other parties. The communication may comprise, for example, communication of voice, electronic mail (email), text messages, data, multimedia and so on. A communication device typically enables a user of the device to receive and transmit communication via a communication system and can thus be used for accessing various service applications.

A communication system is a facility which facilitates the communication between two or more entities such as the communication devices, network entities and other nodes. A communication system may be provided by one or more interconnect networks. One or more gateway nodes may be provided for interconnecting various networks of the system. For example, a gateway node is typically provided between an access network and other communication networks, for example a core network and/or a data network.

An appropriate access system allows the communication device to access to the wider communication system. An access to the wider communications system may be provided by means of a fixed line or wireless communication interface, or a combination of these. Communication systems providing wireless access typically enable at least some mobility for the users thereof.

A wireless access system typically operates in accordance with a wireless standard and/or with a set of specifications which set out what the various elements of the system are permitted to do and how that should be achieved. Examples include GSM (Global System for Mobile) EDGE (Enhanced Data for GSM Evolution) Radio Access Networks (GERAN), Universal Terrestrial Radio Access Networks (UTRAN), and evolved Universal Terrestrial Radio Access Networks (EU-TRAN). For example, the standard or specification may define if the user, or more precisely user equipment, is provided with a circuit switched bearer or a packet switched bearer, or both. Communication protocols and/or parameters which should be used for the connection are also typically defined. For example, the manner in which communication should be implemented between the user equipment and the elements of the networks and their functions and responsibilities are typically defined by a predefined communication protocol. Such protocols and or parameters further define the frequency spectrum to be used by which part of the communications system, the transmission power to be used etc.

One technique of communicating over a wireless interface relies on combining the results of detecting a transmission from a communication device at a plurality of access nodes; or detecting a transmission based on signals received at a plurality of access nodes; or more generally, involving a plurality of access nodes in the detection of a transmission. There has been identified the challenge of controlling the power of transmissions from a communication device in such a communication technique.

There is provided a method, comprising: in a communication system involving a plurality of access nodes cooperatively detecting a transmission from a communication device, determining at said communication device a transmission power parameter relating to said communication device at least partly on the basis of a plurality of pathloss values including a first pathloss value for a first set of access nodes of said plurality of access nodes transmitting a first reference signal at substantially the same transmission power and a second pathloss value for one or more second access nodes of said plurality of access nodes transmitting a second reference signal at substantially the same transmission power.

In one embodiment, the method further comprises: determining said transmission power parameter at least partly on the basis of one of the following: (i) an average of said plurality of pathloss values; (ii) a lowest one of said plurality of pathloss values; and (iii) an inverse of the sum of the inverses of said plurality of pathloss values.

In one embodiment, the method further comprises: determining said first pathloss value on the basis of one or more measurements of a power at which said first reference signal is received at said communication device, and determining said second pathloss value on the basis of one or more measurements of a power at which said second reference signal is received at said communication device.

In one embodiment, the method further comprises: receiving at said communication device information about the transmission powers of the first and second reference signals.

In one embodiment, said first reference signal is transmitted at a first transmission power; and said second reference signal is transmitted at a second transmission power different to said first transmission power.

There is also provided a method comprising: in a communication system involving a plurality of access nodes cooperatively detecting a transmission from a communication device, determining at said communication device a transmission power parameter relating to said communication device at least partly on the basis of respective pathloss values for a plurality of access nodes or groups of access nodes, wherein the method comprises: determining said transmission power parameter at least partly on the basis of one of the following: (i) an average of said pathloss values; (ii) a lowest one of said pathloss values; and (iii) an inverse of the sum of the inverses of said pathloss values.

In one embodiment, said pathloss values comprise a pathloss value for at least one group of access nodes transmitting a common reference signal at substantially the same transmission power.

In one embodiment, said pathloss values comprise at least: a pathloss value for a first access node or group of access nodes transmitting a first reference signal at a first transmission power; and a pathloss value for a second access node or group of access nodes transmitting a second reference signal with a second transmission power different to said first transmission power.

In one embodiment, the method further comprises: determining said transmission power parameter at least partly on the basis of respective pathloss values for each access node or group of access nodes for which the communication device is configured to provide feedback about one or more parameters of received transmissions.

In one embodiment, the method further comprises: receiving at said communication device an indication of the plurality of access nodes or groups of access nodes for which pathloss values are to be used for controlling transmission power.

In one embodiment, said transmission power parameter is a transmission power of a transmission from said communication device, and further comprising: controlling the power of said transmission on the basis of said transmission power parameter.

In one embodiment, the method further comprises: controlling the power of said transmission also taking into account one or more of the following: one or more power control commands received at the communication device; a transport format; a number of allocated physical resource blocks; and a maximum allowed transmission power value.

In one embodiment, said transmission power parameter is a power headroom value.

There is also provided a method comprising: in a communication system involving a plurality of access nodes cooperatively detecting a transmission from a communication device: transmitting towards said communication device from a radio access network information identifying a plurality of access nodes or groups of access nodes for which said communication device is to determine respective pathloss values for use in determining a transmission power parameter relating to said communication device, wherein said information identifies at least a first set of access nodes of said plurality of access nodes for which the communication device is to measure a first pathloss value and one or more second access nodes of said plurality of access nodes for which said communication device is to determine a second pathloss value, wherein said first set of access nodes transmit a first reference signal at substantially the same transmission power and the one or more second access nodes transmit a second reference signal at substantially the same transmission power.

In one embodiment, the method further comprises transmitting from said radio access network towards said communication device information about the respective transmission powers of said first and second reference signals.

In one embodiment, said first set of access nodes transmit said first reference signal at a first transmission power; and said one or more second access nodes transmit said second reference signal with a second transmission power different to said first transmission power.

In one embodiment, the method further comprises determining a closed-loop power control command based on one or more measurements of power at which one or more transmissions are received at said plurality of access nodes, and transmitting said power control command to the communication device. There is also provided an apparatus comprising: a processor and memory including computer program code, wherein the memory and computer program code are configured to, with the processor, cause the apparatus to: in a communication system involving a plurality of access nodes cooperatively detecting a transmission from a communication device, determine at said communication device a transmission power parameter relating to said communication device at least partly on the basis of a plurality of pathloss values including a first pathloss value for a first set of access nodes of said plurality of access nodes transmitting a first reference signal at substantially the same transmission power and a second pathloss value for one or more second access nodes of said plurality of access nodes transmitting a second reference signal at substantially the same transmission power.

In one embodiment, said memory and computer program code are configured to, with the processor, cause the apparatus to: determine said transmission power parameter at least partly on the basis of one of the following: (i) an average of said plurality of pathloss values; (ii) a lowest one of said plurality of pathloss values; and (iii) an inverse of the sum of the inverses of said plurality of pathloss values.

In one embodiment, said memory and computer program code are configured to, with the processor, cause the apparatus to: determine said first pathloss value on the basis of one or more measurements of a power at which said first reference signal is received at said communication device, and determine said second pathloss value on the basis of one or more measurements of a power at which said second reference signal is received at said communication device.

In one embodiment, said memory and computer program code are configured to, with the processor, cause the apparatus to: receive at said communication device information about the transmission powers of the first and second reference signals.

In one embodiment, said first reference signal is transmitted at a first transmission power; and said second reference signal is transmitted at a second transmission power different to said first transmission power.

There is also provided an apparatus comprising: a processor and memory including computer program code, wherein the memory and computer program code are configured to, with the processor, cause the apparatus to: in a communication system involving a plurality of access nodes cooperatively detecting a transmission from a communication device, determine at said communication device a transmission power parameter controlling the power of said transmission relating to said communication device at least partly on the basis of respective pathloss values for a plurality of access nodes or groups of access nodes; and determine said transmission power parameter at least partly on the basis of one of the following: (i) an average of said pathloss values; (ii) a lowest one of said pathloss values; and (iii) an inverse of the sum of the inverses of said pathloss values.

In one embodiment, said pathloss values comprise a pathloss value for at least one group of access nodes transmitting a common reference signal at substantially the same transmission power.

In one embodiment, said pathloss values comprise at least: a pathloss value for a first access node or group of access nodes transmitting a first reference signal at a first transmission power; and a pathloss value for a second access node or group of access nodes transmitting a second reference signal with a second transmission power different to said first transmission power.

In one embodiment, said memory and computer program code are configured to, with the processor, cause the apparatus to: determine said transmission power parameter at least partly on the basis of respective pathloss values for each access node or group of access nodes for which the communication device is configured to provide feedback about one or more parameters of received transmissions.

In one embodiment, said memory and computer program code are configured to, with the processor, cause the apparatus to: receive at said communication device an indication of the plurality of access nodes or groups of access nodes for which pathloss values are to be used for controlling transmission power.

In one embodiment, said transmission power parameter is a transmission power of a transmission from said communication device, and wherein said memory and computer program code are configured to, with the processor, cause the apparatus to control the power of said transmission on the basis of said transmission power parameter.

In one embodiment, said memory and computer program code are configured to, with the processor, cause the apparatus to: control the power of said transmission also taking into account one or more of the following: one or more power control commands received at the communication device; a transport format; a number of allocated physical resource blocks; and a maximum allowed transmission power value.

In one embodiment, said transmission power parameter is a power headroom value.

There is also provided an apparatus comprising: a processor and memory including computer program code, wherein the memory and computer program code are configured to, with the processor, cause the apparatus to: in a communication system involving a plurality of access nodes cooperatively detecting a transmission from a communication device: transmit towards said communication device from a radio access network information identifying a plurality of access nodes or groups of access nodes for which said communication device is to determine respective pathloss values for use in determining a transmission power parameter relating to said communication device, wherein said information identifies at least a first set of access nodes of said plurality of access nodes for which the communication device is to measure a first pathloss value and one or more second access nodes of said plurality of access nodes for which said communication device is to determine a second pathloss value, wherein said first set of access nodes transmit a first reference signal at substantially the same transmission power and the one or more second access nodes transmit a second reference signal at substantially the same transmission power.

In one embodiment, said memory and computer program code are configured to, with the processor, cause the apparatus to transmit from said radio access network towards said communication device information about the respective transmission powers of said first and second reference signals.

In one embodiment, said first set of access nodes transmit said first reference signal at a first transmission power; and said one or more second access nodes transmit said second reference signal with a second transmission power different to said first transmission power.

In one embodiment, said memory and computer program code are configured to, with the processor, cause the apparatus to determine a closed-loop power control command based on one or more measurements of power at which one or more transmissions are received at said plurality of access nodes, and transmitting said power control command to the communication device.

There is also provided an apparatus configured to carry out any of the above methods.

There is also provided user equipment and a base station comprising any of the above apparatus.

In one embodiment, the base station is an eNodeB.

There is also provided a computer program product comprising program code means which when loaded into a computer controls the computer to: in a communication system involving a plurality of access nodes cooperatively detecting a transmission from a communication device, determine at said communication device a transmission power parameter relating to said communication device at least partly on the basis of a plurality of pathloss values including a first pathloss value for a first set of access nodes of said plurality of access nodes transmitting a first reference signal at substantially the same transmission power and a second pathloss value for one or more second access nodes of said plurality of access nodes transmitting a second reference signal at substantially the same transmission power.

There is also provided a computer program product comprising program code means which when loaded into a computer controls the computer to: in a communication system involving a plurality of access nodes cooperatively detecting a transmission from a communication device, determine at said communication device a transmission power parameter relating to said communication device at least partly on the basis of respective pathloss values for a plurality of access nodes or groups of access nodes; and determine said transmission power parameter at least partly on the basis of one of the following: (i) an average of said pathloss values; (ii) a lowest one of said pathloss values; and (iii) an inverse of the sum of the inverses of said pathloss values.

There is also provided a computer program product comprising program code means which when loaded into a computer controls the computer to: transmit towards said communication device from a radio access network information identifying a plurality of access nodes or groups of access nodes for which said communication device is to determine respective pathloss values for use in determining a transmission power parameter relating to said communication device, wherein said information identifies at least a first set of access nodes of said plurality of access nodes for which the communication device is to measure a first pathloss value and one or more second access nodes of said plurality of access nodes for which said communication device is to determine a second pathloss value, wherein said first set of access nodes transmit a first reference signal at substantially the same transmission power and the one or more second access nodes transmit a second reference signal at substantially the same transmission power.

Hereunder, embodiments of the present invention will be described in detail, by way of example only, with reference to the following drawings, in which.

Embodiments of the invention are described below, by way of example only, in the context of a Coordinated Multi-Point (CoMP) reception system proposed as a development for a Long Term Evolution (LTE)-Advanced radio access system. However, the same kind of techniques are also of use in other systems in which communicating over a wireless interface relies on involving a plurality of access nodes in the cooperative detection of a transmission from a communication device.

Figure 1:
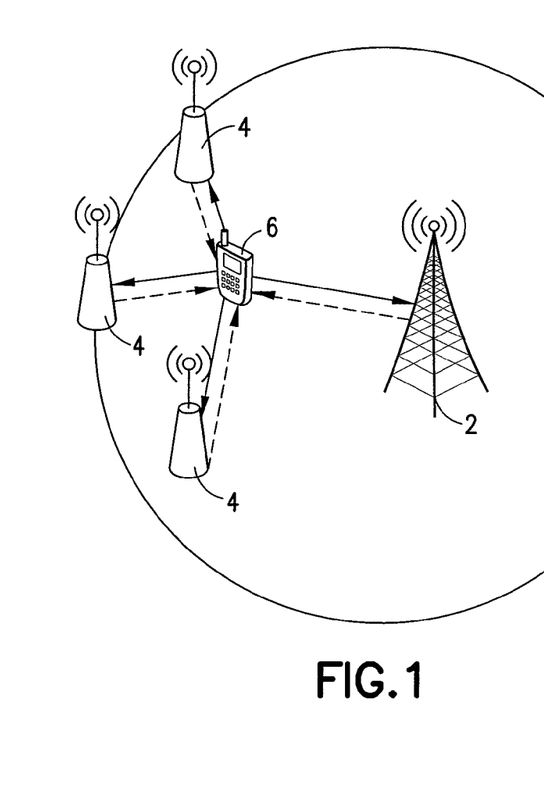
FIG. 1 illustrates an example of a network within which embodiments of the invention may be implemented, which network includes a macro eNB serving a relatively wide area and RRUs serving respective smaller areas within the area served by the macro eNB.

FIG. 1 illustrates one example of a CoMP technique. An uplink signal from user equipment 6 is received at multiple, geographically separated points including a macro eNodeB (eNB) 2 and a plurality of remote radio units (RRUs) 4. A source signal from user equipment 6 is reconstructed from the observations of said source signal at said macro eNB 2 and RRUs 4. Such joint signal processing can enable the exploitation of interference, and can realise gains in spectral efficiency. The signal processing can, for example, be carried out at a central processing unit based on information received from the macro eNB 2 and RRUs 4, or at one or more of the macro eNB 2 and RRUs 4 following the exchange of information between the macro eNB 2 and RRUs 4.

The macro eNB 2 could, for example, be one of a large number of similar macro eNBs forming a cellular access network. The RRUs 4 could, for example, be low power eNBs (such as Home eNodeBs (HeNBs)) with a link to a core network other than via macro eNB 2, or a set of relay nodes operating under macro eNB 2 as a Donor eNB (DeNB).

In FIG. 1: the solid line arrows indicate the detection at the macro eNB 2 and RRUs 4 of a transmission by UE 6; and the broken line arrows indicate the detection at UE 6 of reference signals transmitted by the macro eNB 2 and RRUs 4.

Figure 2:
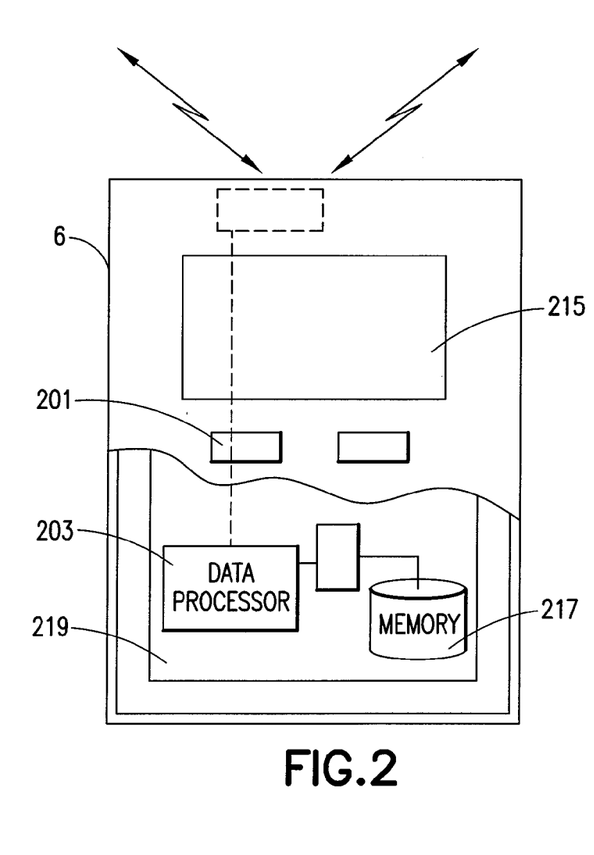
FIG. 2 illustrates an example of user equipment shown in FIG. 1 in further detail.

FIG. 2 shows a schematic partially sectioned view of an example of user equipment 6 that may be used for communicating with the macro eNB 2 and RRUs 4 of FIG. 1 via a wireless interface. The user equipment (UE) 6 may be used for various tasks such as making and receiving phone calls, for receiving and sending data from and to a data network and for experiencing, for example, multimedia or other content.

The UE 6 may be any device capable of at least sending or receiving radio signals. Non-limiting examples include a mobile station (MS), a portable computer provided with a wireless interface card or other wireless interface facility, personal data assistant (PDA) provided with wireless communication capabilities, or any combinations of these or the like. The UE 6 may communicate via an appropriate radio interface arrangement of the UE 6. The interface arrangement may be provided for example by means of a radio part and associated antenna arrangement. The antenna arrangement may be arranged internally or externally to the UE 6.

The UE 6 may be provided with at least one data processing entity 203 and at least one memory or data storage entity 217 for use in tasks it is designed to perform. The data processor 213 and memory 217 may be provided on an appropriate circuit board 219 and/or in chipsets.

The user may control the operation of the UE 6 by means of a suitable user interface such as key pad 201, voice commands, touch sensitive screen or pad, combinations thereof or the like. A display 215, a speaker and a microphone may also be provided. Furthermore, the UE 6 may comprise appropriate connectors (either wired or wireless) to other devices and/or for connecting external accessories, for example hands-free equipment, thereto.

Figure 3:
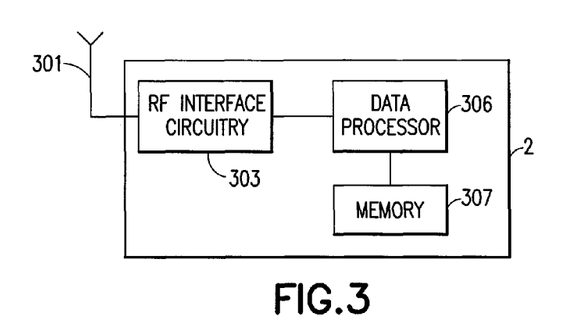
FIG. 3 illustrates an example of an apparatus suitable for implementing an embodiment of the invention at a RRU or macro eNB of the network shown in FIG. 1.
Figure 4:
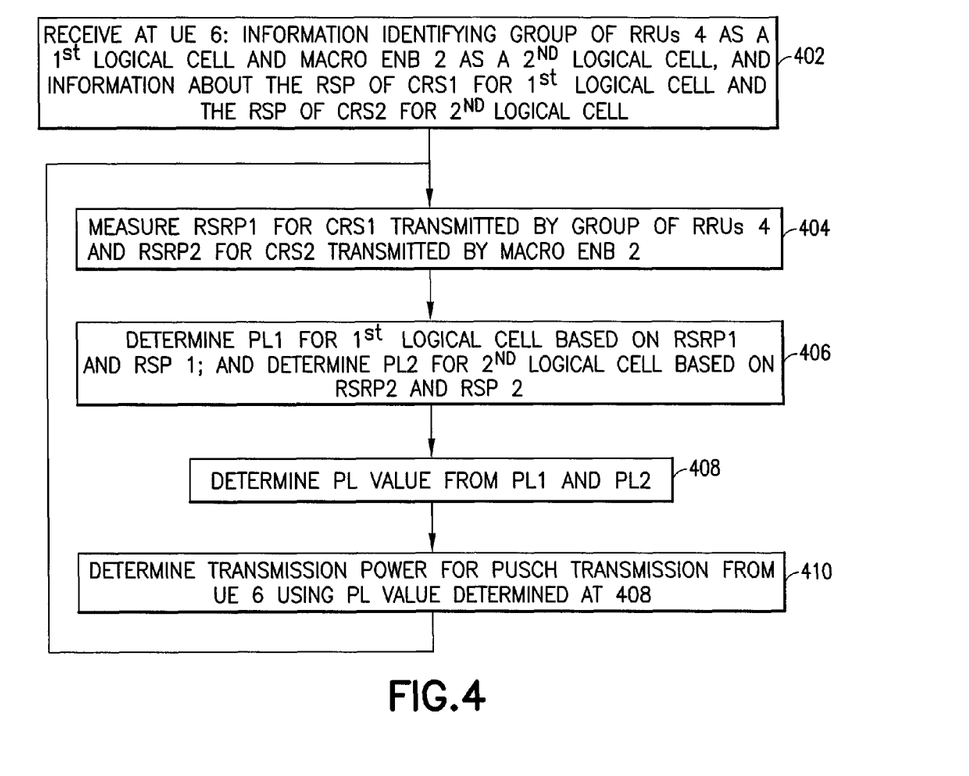
FIG. 4 illustrates an example of the operations of user equipment of FIG. 1 in accordance with an embodiment of the present invention.

FIG. 3 shows an example of apparatus for use at the RRUs 4 and the macro eNB 2. The apparatus comprises a radio frequency antenna 301 configured to receive and transmit radio frequency signals; radio frequency interface circuitry 303 configured to interface the radio frequency signals received and transmitted by the antenna 301 and the data processor 306. The radio frequency interface circuitry 303 may also be known as a transceiver. The data processor 306 is configured to process signals from the radio frequency interface circuitry 303, control the radio frequency interface circuitry 303 to generate suitable RF signals to communicate information to the UE 6 via the wireless communications link. The memory 307 is used for storing data, parameters and instructions for use by the data processor 306.

It would be appreciated that both the UE 6 and the apparatus shown in FIGS. 2 and 3 respectively and described above may comprise further elements which are not directly involved with the embodiments of the invention described hereafter. According to one embodiment of the invention, UE 6 controls the transmission of physical uplink shared channel (PUSCH) transmissions according to the following equation:

$$P_{PUSCH}(i) = \min\{P_{CMAX}, 10\log_{10}(M_{PUSCH}(i)) + P_{O\_PUSCH}(j) + \alpha(j) \cdot PL + \Delta_{TF}(i) + f(i)\} [dBm]$$

where, $P_{CMAX}$ is the configured UE transmitted power defined in [3GPP TS 36.101]

$M_{PUSCH}(i)$ is the bandwidth of the PUSCH resource assignment expressed in number of resource blocks valid for subframe i.

$P_{O\_PUSCH}(j)$ is a parameter composed of the sum of a cell specific nominal component $P_{O\_NOMINAL\_PUSCH}(j)$ provided from higher layers for j=0 and 1 and a UE specific component $P_{O\_UE\_PUSCH}(j)$ provided by higher layers for j=0 and 1. For PUSCH (re)transmissions corresponding to a semi-persistent grant then j=0, for PUSCH (re)transmissions corresponding to a dynamic scheduled grant then j=1 and for PUSCH (re)transmissions corresponding to the random access response grant then j=2. $P_{O\_UE\_PUSCH}(2) = 0$ and $P_{O\_NOMINAL\_PUSCH}(2) = P_{O\_PRE} + \Delta_{PREAMBLE\_Msg3}$, where the parameter PREAMBLE_INITIAL_RECEIVED_TARGET_POWER [3GPP TS 36.321] ($P_{O\_PRE}$) and $\Delta_{PREAMBLE\_Msg3}$ are signalled from higher layers.

For j=0 or 1, $\alpha \in \{0, 0.4, 0.5, 0.6, 0.7, 0.8, 0.9, 1\}$ is a 3-bit cell specific parameter provided by higher layers. For j=2, $\alpha(j)=1$.

PL is the downlink pathloss estimate calculated in the UE in dB and PL=referenceSignalPower−higher layer filtered RSRP, where referenceSignalPower is provided by higher layers and RSRP is defined in [3GPP TS 36.214] and the higher layer filter configuration is defined in [3GPP TS 36.331]

$\Delta_{TF}(i) = 10\log_{10}((2^{MPR \cdot K_S} - 1)\beta_{offset}^{PUSCH})$ for $K_S = 1.25$ and 0 for $K_S = 0$ where $K_S$ is given by the UE specific parameter deltaMCS-Enabled provided by higher layers MPR=$O_{CQI}/N_{RE}$ for control data sent via PUSCH without UL-SCH data and $$\sum_{r=0}^{C-1} K_r / N_{RE}$$

for other cases.

where C is the number of code blocks, $K_r$ is the size for code block r, $O_{CQI}$ is the number of CQI bits including CRC bits and $N_{RE}$ is the number of resource elements determined as $N_{RE} = M_{sc}^{PUSCH-initial} \cdot N_{symb}^{PUSCH-initial}$, where C, $K_r$, $M_{sc}^{PUSCH-initial}$ and $N_{symb}^{PUSCH-initial}$ are defined in [3GPP TS 36.212].

$\beta_{offset}^{PUSCH} = \beta_{offset}^{CQI}$ for control data sent via PUSCH without UL-SCH data and 1 for other cases.

$\delta_{PUSCH}$ is a UE specific correction value, also referred to as a TPC command and is included in PDCCH with DCI format 0 or jointly coded with other TPC commands in PDCCH with DCI format 3/3A whose CRC parity bits are scrambled with TPC-PUSCH-RNTI. The current PUSCH power control adjustment state is given by f(i) which is defined by:

$f(i) = f(i-1) + \delta_{PUSCH}(i - K_{PUSCH})$ if accumulation is enabled based on the UE-specific parameter Accumulation-enabled provided by higher layers or if the TPC command $\delta_{PUSCH}$ is included in a PDCCH with DCI format 0 where the CRC is scrambled by the Temporary C-RNTI where $\delta_{PUSCH}(i - K_{PUSCH})$ was signalled on PDCCH with DCI format 0 or 3/3A on subframe $i - K_{PUSCH}$, and where f(0) is the first value after reset of accumulation.

The value of $K_{PUSCH}$ is

For FDD, $K_{PUSCH} = 4$

For TDD UL/DL configurations 1-6, $K_{PUSCH}$ is given in 3GPP TS 36.213-930 Table 5.1.1.1-1

For TDD UL/DL configuration 0

If the PUSCH transmission in subframe 2 or 7 is scheduled with a PDCCH of DCI format 0 in which the LSB of the UL index is set to 1, $K_{PUSCH} = 7$ For all other PUSCH transmissions, $K_{PUSCH}$ is given in 3GPP TS 36.213-930 Table 5.1.1.1-1.

The UE attempts to decode a PDCCH of DCI format 0 with the UE's C-RNTI or SPS C-RNTI and a PDCCH of DCI format 3/3A with this UE's TPC-PUSCH-RNTI in every subframe except when in DRX If DCI format 0 and DCI format 3/3A are both detected in the same subframe, then the UE shall use the $\delta_{PUSCH}$ provided in DCI format 0.

$\delta_{PUSCH}$=0 dB for a subframe where no TPC command is decoded or where DRX occurs or i is not an uplink subframe in TDD.

The $\delta_{PUSCH}$ dB accumulated values signalled on PDCCH with DCI format 0 are given in 3GPP TS 36.213-930 Table 5.1.1.1-2. If the PDCCH with DCI format 0 is validated as a SPS activation or release PDCCH, then $\delta_{PUSCH}$ is 0 dB.

The $\delta_{PUSCH}$ dB accumulated values signalled on PDCCH with DCI format 3/3A are one of SET1 given in 3GPP TS 36.213-930 Table 5.1.1.1-2 or SET2 given in 3GPP TS 36.213-930 Table 5.1.1.1-3 as determined by the parameter TPC-Index provided by higher layers.

If UE has reached maximum power, positive TPC commands shall not be accumulated

If UE has reached minimum power, negative TPC commands shall not be accumulated

UE shall reset accumulation when $P_{O\_UE\_PUSCH}$ value is changed by higher layers when the UE receives random access response message $f(i)=\delta_{PUSCH}(i-K_{PUSCH})$ if accumulation is not enabled based on the UE-specific parameter Accumulation-enabled provided by higher layers where $\delta_{PUSCH}(i-K_{PUSCH})$ was signalled on PDCCH with DCI format 0 on subframe $i-K_{PUSCH}$ The value of $K_{PUSCH}$ is For FDD, $K_{PUSCH}$=4

For TDD UL/DL configurations 1-6, $K_{PUSCH}$ is given in 3GPP TS 36.213-930 Table 5.1.1.1-1

For TDD UL/DL configuration 0

If the PUSCH transmission in subframe 2 or 7 is scheduled with a PDCCH of DCI format 0 in which the LSB of the UL index is set to 1, $K_{PUSCH}$=7

For all other PUSCH transmissions, $K_{PUSCH}$ is given in 3GPP TS 36.213-930 Table 5.1.1.1-1.

The $\delta_{PUSCH}$ dB absolute values signalled on PDCCH with DCI format 0 are given in Table 5.1.1.1-2. If the PDCCH with DCI format 0 is validated as a SPS activation or release PDCCH, then $\delta_{PUSCH}$ is 0 dB.

$f(i)=f(i-1)$ for a subframe where no PDCCH with DCI format 0 is decoded or where DRX occurs or i is not an uplink subframe in TDD.

For both types of f(*) (accumulation or current absolute) the first value is set as follows:

If $P_{O\_UE\_PUSCH}$ value is changed by higher layers, f(0)=0

Else f(0)=$\Delta P_{rampup}+\delta_{msg2}$ where $\delta_{msg2}$ is the TPC command indicated in the random access response, see 3GPP TS 36.213-930 Section 6.2, and $\Delta P_{rampup}$ is provided by higher layers and corresponds to the total power ramp-up from the first to the last preamble In this non-limiting example, the macro eNB 2 is configured to transmit reference signals, and each of the RRUs 4 is configured to transmit common reference signals at a common transmission power. UE 6 sees the plurality of RRUs 4 as a single logical cell transmitting a unique cell reference signal (CRS). For the downlink pathloss estimate value PL for the above equation, UE 6 is configured to use a pathloss value determined from a combination of: (a) a pathloss value PL1 determined from a measurement of high layer filtered RSRP for the CRS transmitted by the macro eNB 2; and (b) a pathloss value PL2 determined from a measurement of high layer filtered RSRP for the CRS transmitted by the group of RRUs 4; wherein RSRP is reference signal received power as defined in 3GPP TS 36.214, and the higher layer filter configuration is defined in 3GPP TS 36.331. In more detail, the pathloss values PL1 and PL2 are determined by subtracting the respective higher layer filtered RSRP value from a respective reference signal power (RSP) value. The latter is communicated to UE 6 via higher layer signalling.

In one embodiment, the PL value for the above power control equation is the average of pathloss values PL1 and PL2. In another embodiment, the PL value for the above power control equation is the lowest of pathloss values PL1 and PL2. In yet another embodiment, PL1 and PL2 are linear values, and the PL value for the above power control equation is the inverse of the sum of the inverses of the pathloss values PL1 and PL2. In yet another embodiment, the PL value for the above power control equation is determined according to the following equation:

$$PL=PL_1-10\log_{10}(1+10^{(PL_1-PL_2)/10})$$

In one embodiment, the set of cell reference signals that UE 6 is to use to determine the PL value for the above-mentioned power control equation (i.e. for the example above, the CRS transmitted by macro eNB 2 and the CRS transmitted at a common transmission power by each of RRUs 4) is predetermined to be the same set of reference signals for which the UE 6 is instructed by the radio access network (via higher layer signalling) to provide channel state information (CSI) feedback to the radio access network. In another embodiment, the set of cell reference signals that UE 6 is to use to determine the PL value for the above-mentioned power control equation is configured independently from the set of cell reference signals for which the UE 6 is configured to provide CSI feedback to the radio access network; and the radio access network uses higher layer signalling to also provide a separate indication of the set of cell reference signals that UE 6 is to use to determine the PL value for the above-mentioned power control equation.

An embodiment of the present invention has been described above for the example of UE 6 operating according to the power control equation specified at 3GPP TS 36.213-930. However, the same kind of technique for determining a pathloss value to be used in determining transmission power could be applied, for example, to any power control technique including an open-loop component based on a pathloss value.

The same PL value determined from pathloss values PL1 and PL2 can also, or alternatively, be used for determining other transmission power parameters such as, for example, an indicator of the additional return power available at UE 6, which is known as the power headroom value. One example of determining the power headroom value based on a PL value is described at 3GPP TS 36.213-930, where power headroom PH is defined by the following equation:

$$PH(i) = P_{CMAX} - \{10 \log_{10}(M_{PUSCH}(i)) + P_{O\_PUSCH}(j) + \alpha(j) \cdot PL + \Delta_{TF}(i) + f(i)\}$$

wherein each symbol is as specified above for the equation for calculating transmission power for PUSCH.

An embodiment of the invention has been described above for the example where the PL value for the transmission power equation (or other power equation) is based on two pathloss values. However, in other examples, the PL value could be based on a larger number of individual pathloss values. The individual pathloss values could, for example, include as many pathloss values as there are different reference signal transmission powers among the access nodes involved in the coordinated multi-point reception of a transmission from UE 6.

Also, in the example described above, the PL value is based on a mixture of different kinds of individual pathloss values, i.e. a mixture of a pathloss value for a group of receiving points and a pathloss value for an individual receiving point. However, in other examples, the PL value could be based on individual pathloss values that are either all for respective groups of receiving points or all for respective individual receiving points. For example, the PL value could be based on an individual pathloss value for two or more macro eNBs 2 (e.g. the macro eNB 2 shown in FIG. 1 and one or more neighbouring macro eNBs) and an individual pathloss value for the group of RRUs 4.

The above-described operations may require data processing in the various entities. The data processing may be provided by means of one or more data processors. Similarly various entities described in the above embodiments may be implemented within a single or a plurality of data processing entities and/or data processors. Appropriately adapted computer program code product may be used for implementing the embodiments, when loaded to a computer. The program code product for providing the operation may be stored on and provided by means of a carrier medium such as a carrier disc, card or tape. A possibility is to download the program code product via a data network. Implementation may be provided with appropriate software in a server.

For example the embodiments of the invention may be implemented as a chipset, in other words a series of integrated circuits communicating among each other. The chipset may comprise microprocessors arranged to run code, application specific integrated circuits (ASICs), or programmable digital signal processors for performing the operations described above.

Embodiments of the invention may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication. In addition to the modifications explicitly mentioned above, it will be evident to a person skilled in the art that various other modifications of the described embodiment may be made within the scope of the invention.

The invention claimed is:

1. A method, comprising:
in a communication system involving a plurality of access nodes,
acquiring by a communication device, a first pathloss value for first one or more access nodes of said plurality of access nodes, and a second pathloss value for second one or more access nodes of said plurality of access nodes, wherein the first pathloss value and the second pathloss value are acquired based on channel state information (CSI) configuration for which the communication device is instructed by the communication system to provide channel state information feedback to the communication system; and
determining at said communication device, a transmission power parameter relating to said communication device at least partly on the basis of a pathloss difference value given by P1-P2, where P1 is the first pathloss value for the first one or more access nodes of said plurality of access nodes and P2 is the second pathloss value for the second one or more access nodes of said plurality of access nodes.

2. A method according to claim 1, wherein at least one of the first and second pathloss values comprises one of the following: (i) an average of a plurality of pathloss values; (ii) a lowest one of a plurality of pathloss values; and (iii) an inverse of the sum of the inverses of a plurality of pathloss values.

3. A method according to claim 1, comprising: determining said first pathloss value on the basis of one or more measurements of a power at which a first reference signal is received at said communication device, and determining said second pathloss value on the basis of one or more measurements of a power at which a second reference signal is received at said communication device.

4. A method according to claim 3, comprising: receiving at said communication device information about the transmission powers of the first and second reference signals.

5. A method according to claim 3, wherein said first reference signal is transmitted at a first transmission power; and said second reference signal is transmitted at a second transmission power different to said first transmission power.

6. A method, according to claim 1, comprising: determining said transmission power parameter at least partly on the basis of respective pathloss values for each access node or group of access nodes for which the communication device is configured to provide feedback about one or more parameters of received transmissions.

7. A method according to claim 1, comprising: controlling the power of said transmission also taking into account one or more of the following: one or more power control commands received at the communication device; a transport format; a number of allocated physical resource blocks; and a maximum allowed transmission power value.

8. A method according to claim 1, wherein said transmission power parameter is a power headroom value.

9. A method comprising:
in a communication system involving a plurality of access nodes,
determining at a communication device a transmission power parameter relating to said communication device at least partly on the basis of respective pathloss values for a plurality of access nodes or groups of access nodes, and at least partly on the basis of one of the following: (i) an average of a plurality of pathloss values; (ii) a lowest one of a plurality of pathloss values; and (iii) an inverse of the sum of the inverses of a plurality of pathloss values,
wherein the pathloss values comprise different reference signal transmission powers used among access nodes involved in coordinated multi-point reception of a transmission from the communication device, and
the pathloss values are acquired by the communication device based on channel state information (CSI) configuration for which the communication device is instructed by the communication system to provide channel state information feedback to the communication system.

10. A method according to claim 9, wherein said pathloss values comprise a pathloss value for at least one group of access nodes transmitting a common reference signal at substantially the same transmission power.

11. A method according to claim 9, wherein the first pathloss value is for the first one or more access nodes transmitting a first reference signal at a first transmission power; and the second pathloss value is for the second one or more access nodes transmitting a second reference signal with a second transmission power different to said first transmission power.

12. A method comprising: in a communication system involving a plurality of access nodes:
transmitting towards a communication device from a radio access network information identifying a plurality of access nodes or groups of access nodes for which said communication device is to determine respective pathloss values for use in determining a transmission power parameter relating to said communication device,
wherein said information identifies at least a first set of access nodes of said plurality of access nodes for which the communication device is to measure a first pathloss value and one or more second access nodes of said plurality of access nodes for which said communication device is to determine a second pathloss value,
wherein the transmission power parameter is determined at least partly on the basis of a pathloss difference value given by P1-P2, where P1 is the first pathloss value and P2 is the second pathloss value, and
the first pathless value and the second pathloss value are acquired based on channel state information (CSI) configuration for which the communication device is instructed by the communication system to provide channel state information feedback to the communication system.

13. A method according to claim 12, comprising transmitting from said radio access network towards said communication device information about the respective transmission powers of said first and second reference signals.

14. A method according to claim 12, comprising determining a closed-loop power control command based on one or more measurements of power at which one or more transmissions are received at said plurality of access nodes, and transmitting said power control command to the communication device.

15. An apparatus comprising:
a processor and memory including computer program code,
wherein the memory and computer program code are configured to, with the processor, cause the apparatus to:
in a communication system involving a plurality of access nodes,
acquire by the apparatus, a first pathloss value for first one or more access nodes of said plurality of access nodes, and a second pathloss value for second one or more access nodes of said plurality of access nodes, wherein the first pathless value and the second pathloss value are acquired based on channel state information (CSI) configuration for which the communication device is instructed by the communication system to provide channel state information feedback to the communication system; and
determine at said apparatus, a transmission power parameter relating to said apparatus at least partly on the basis of a pathloss difference value given by P1-P2, where P1 is the first pathloss value for the first one or more access nodes of said plurality of access nodes and P2 is the second pathloss value for the second one or more access nodes of said plurality of access nodes.

16. An apparatus comprising:
a processor and memory including computer program code,
wherein the memory and computer program code are configured to, with the processor, cause the apparatus to:
in a communication system involving a plurality of access nodes,
determine at said apparatus a transmission power parameter controlling power of said transmission relating to said apparatus at least partly on the basis of respective pathloss values for a plurality of access nodes or groups of access nodes and at least partly on the basis of one of the following: (i) an average of said pathloss values; (ii) a lowest one of said pathloss values; and (iii) an inverse of the sum of the inverses of said pathloss values,
wherein the pathloss values comprise different reference signal transmission powers used among access nodes involved in coordinated multi-point reception of a transmission from the apparatus, and
the pathloss values are acquired by the communication device based on channel state information (CSI) configuration for which the communication device is instructed by the communication system to provide channel state information feedback to the communication system.

17. An apparatus comprising:
a processor and memory including computer program code,
wherein the memory and computer program code are configured to, with the processor, cause the apparatus to:
in a communication system involving a plurality of access nodes:
transmit towards a communication device from a radio access network information identifying a plurality of access nodes or groups of access nodes for which said communication device is to determine respective pathloss values for use in determining a transmission power parameter relating to said communication device,
wherein said information identifies at least a first set of access nodes of said plurality of access nodes for which the communication device is to measure a first pathloss value and one or more second access nodes of said plurality of access nodes for which said communication device is to determine a second pathloss value,
wherein the transmission power parameter is determined at least partly on the basis of a pathloss difference value between given by P1-P2, where P1 is the first pathloss value and P2 is the second pathloss value, and
the first pathloss value and the second pathloss value are acquired based on channel state information (CSI) configuration for which the communication device is instructed by the communication system to provide channel state information feedback to the communication system.

18. A computer readable memory storing computer program code which when loaded into a computer controls the computer to:
in a communication system involving a plurality of access nodes,
acquire a first pathloss value for first one or more access nodes of said plurality of access nodes, and a second pathloss value for second one or more access nodes of said plurality of access nodes, wherein the first pathloss value and the second pathloss value are acquired based on channel state information (CSI) configuration for which the communication device is instructed by the communication system to provide channel state information feedback to the communication system; and
determine at said computer, a transmission power parameter relating to a communication device at least partly on the basis of a pathloss difference value given by P1-P2, where P1 is the first pathloss value for the first one or more access nodes of said plurality of access nodes and P2 is the second pathloss value for the second one or more access nodes of said plurality of access nodes.

19. A computer readable memory storing computer program code which when loaded into a computer controls the computer to:
in a communication system involving a plurality of access nodes,
determine at said computer a transmission power parameter relating to a communication device at least partly on the basis of respective pathloss values for a plurality of access nodes or groups of access nodes; and
determine said transmission power parameter at least partly on the basis of one of the following: (i) an average of said pathloss values; (ii) a lowest one of said pathloss values; and (iii) an inverse of the sum of the inverses of said pathloss values,
wherein the pathloss values comprise different reference signal transmission powers used among access nodes involved in coordinated multi-point reception of a transmission from the communication device, and
the pathloss values are acquired by the communication device based on channel state information (CSI) configuration for which the communication device is instructed by the communication system to provide channel state information feedback to the communication system.

20. A computer readable memory storing computer program code which when loaded into a computer controls the computer to:
transmit towards a communication device from a radio access network information identifying a plurality of access nodes or groups of access nodes for which said communication device is to determine respective pathloss values for use in determining a transmission power parameter relating to said communication device,
wherein said information identifies at least a first set of access nodes of said plurality of access nodes for which the communication device is to measure a first pathloss value and one or more second access nodes of said plurality of access nodes for which said communication device is to determine a second pathloss value,
wherein the transmission power parameter is determined at least partly on the basis of a pathloss difference value given by P1-P2, where P1 is the first pathloss value and P2 is the second pathloss value, and
the pathloss values are acquired by the communication device based on channel state information (CSI) configuration for which the communication device is instructed by the communication system to provide channel state information feedback to the communication system.

* * * * *